United States Patent

[11] 3,629,947

[72] Inventor Johann Meier
Casa Clarissa, Brione s.M., Switzerland
[21] Appl. No. 840,386
[22] Filed July 9, 1969
[45] Patented Dec. 28, 1971
[32] Priority July 15, 1968
[33] Switzerland
[31] 10523/68

[54] APPARATUS FOR MEASURING LENGTHS
5 Claims, 11 Drawing Figs.
[52] U.S. Cl. .................................................... 33/147 E
[51] Int. Cl. .................................................... G01b 5/02
[50] Field of Search .......................................... 33/125 Q,
169, 170, 143 E, 147 E, 10, 166, 172 E

[56] References Cited
UNITED STATES PATENTS
| | | | |
|---|---|---|---|
| 2,343,621 | 3/1944 | Williams | 353/40 |
| 2,355,910 | 8/1944 | Gallasch | 33/147 E |
| 2,410,093 | 10/1946 | Martinec | 33/172 E |
| 2,462,292 | 2/1949 | Snyder | 33/143 L |
| 2,472,348 | 6/1949 | Skinner | 33/172 E |
| 2,676,515 | 4/1954 | Diehl | 353/40 |
| 2,728,991 | 1/1956 | Rinker | 33/147 E |
| 2,773,311 | 12/1956 | Kettler | 33/147 E |

*Primary Examiner*—Harry N. Haroian
*Attorney*—Werner W. Kleeman

ABSTRACT: A novel apparatus for measuring lengths is disclosed, the apparatus comprising a measuring sensor displaceable in its longitudinal direction. An optically transparent projection scale provided with measuring marks is coupled for movement with the measuring sensor and is displaceable in the same direction thereof. An illumination means is disposed on one side of the projection scale and a projection lens is disposed on the other side thereof. A mirror system is provided and is generally disposed on the same side of the projection scale as is the projection lens. Specifically, a first mirror is disposed in the light path from the projection lens so as to deflect the light beam about a first axis from the projection lens or objective. A second mirror is disposed in the light path of the light beam deflected from the first mirror so as to deflect the light beam about a second axis parallel to the light beam emerging from the projection objective. A third mirror is provided for deflecting the light beam from the second mirror about the a third axis parallel to the second axis. Finally, the novel apparatus includes a multiportion reading scale upon which the measuring marks of the projection scale are projected, the reading scale being disposed transversely to the projection scale and thus transversely to the direction of movement of the measuring sensor.

Johann Meier
INVENTOR

BY Jacobi, Davidson & Kleeman
ATTORNEYS

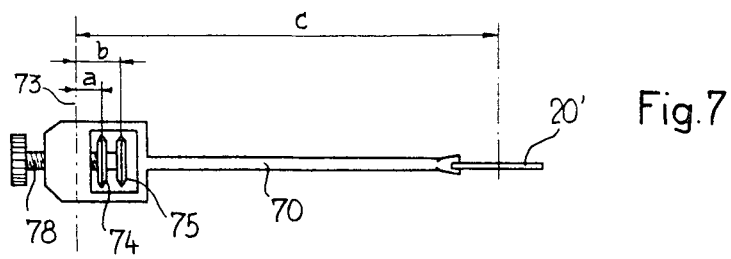
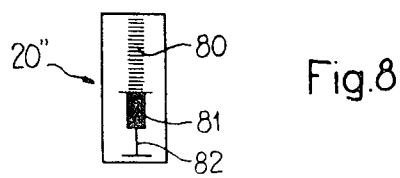
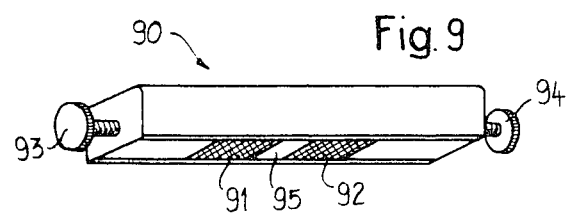
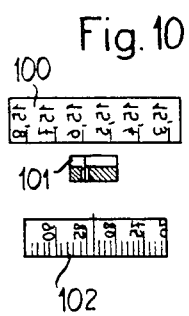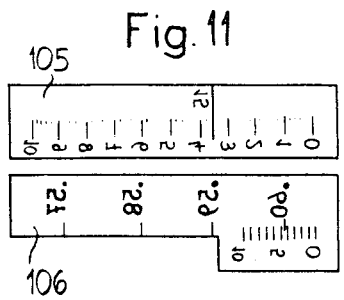

3,629,947

APPARATUS FOR MEASURING LENGTHS

BACKGROUND OF THE INVENTION

The instant invention generally relates to measuring apparatus and particularly concerns an apparatus for measuring lengths having a measuring sensor displaceable along its longitudinal direction.

Measuring devices of the type above described are known as dial gauges in their simplest form. In such gauges, the longitudinal displacement of a measuring sensor is translated into a rotational movement by means of a gear rack and pinion arrangement, the gear rack being connected with the sensor. The rotational movement corresponding to the longitudinal displacement of the measuring sensor is indicated by means of an indicator on a circular scale. With such dial gauges, the smallest lengths or differences in length which can be determined are approximately 5 micrometers. Thus, it can easily be appreciated that measuring devices of this type must be constructed with extremely high precision so as to obtain such great measuring accuracy. These devices, therefore, are quite expensive and very sensitive when utilized and thus, cannot be employed in all environments.

The art also knows of dial gauges in which the displacement of the measuring sensor is indicated on a frosted glass plate through a system which optically projects a displaceable measuring mark. So as to increase the reading accuracy of such gauges as additional displacement of the projected image of the measuring mark is generally provided, this additional displacement being caused by a precision drive means. The additional displacement is quantitatively shown on an additional scale provided on the frosted glass plate or adjacent to the same. While this embodiment of a dial gauge exhibits an extremely high accuracy of measurement, such embodiment is usually large which limits its possibilities of use. Furthermore, the direct reading of the measuring mark projected on the frosted glass plate is not always ensured from every viewing angle. Finally, a device of this type is far too expensive for many utilitarian environments.

SUMMARY OF THE INVENTION

Thus, a need exists for the provision of a measuring device which overcomes the above-mentioned drawbacks of the prior art. It is a primary object of the instant invention to satisfy this need. Further, more specific, yet equally important objects of the instant invention are:

The provision of a measuring device which is relatively inexpensive;

The provision of a measuring device which is of relatively small size;

The provision of a measuring device which is highly sensitive;

The provision of a measuring device in which extremely high reading accuracy can be obtained; and, The provision of a measuring device wherein the measuring reading is ensured from many viewing angles.

These objects as well as other objects which will become apparent from the description hereinbelow, are implemented by the novel apparatus for measuring lengths of the instant invention, said apparatus including a measuring sensor displaceable in its longitudinal direction. An optically transparent projection scale provided with measuring marks is coupled for movement with the measuring sensor and is displaceable in the same direction thereof. An illumination device or means is disposed on one side of the projection scale and an image portrayal means incorporating a projection lens is disposed on the other side of the scale. This image portrayal means also embodies a mirror system and such mirror system being generally disposed on the same side of the projection scale as is the projection lens. The mirror system includes a first mirror disposed in the path of light emanating from the projection lens or objective so as to deflect such light beam about a first axis. A second mirror is disposed in the light path of the light beam deflected from the first mirror so as to deflect such light beam about a second axis parallel to the light beam emerging from the projection objective. A third mirror is provided to deflect the light beam from the second mirror about a third axis parallel to the second axis. Finally, a multiportion reading scale is provided upon which the measuring marks of the projection scale are projected. The multiportion reading scale is disposed transversely to the projection scale and thus transversely to the direction of movement of the measuring sensor.

The novel apparatus of the instant invention can be constructed to have exterior dimensions practically corresponding to those of a mechanical dial gauge. Additionally, such apparatus affords the same accuracy of a dial gauge operating with optical projection yet having an advantage over such optical projection dial gauge in that, in a preferred inventive embodiment, the reading scale can be observed via a mirror in a fashion such that reading of the scale is independent of the angle of observation.

BRIEF DESCRIPTION OF THE DRAWINGS

The invention itself will be better understood and further advantageous features thereof will be appreciated from the following detailed description of preferred inventive embodiments, such description referring to the appended sheets of drawings wherein:

FIG. 5 depicts a side view of important components of a further embodiment of the inventive measuring apparatus;

FIG. 7 depicts a top plan view of a lever arm utilized in the inventive embodiment pursuant to FIG. 6;

FIG. 8 schematically depicts a projection scale as utilized in the inventive embodiment of FIG. 6;

FIG. 9 is a perspective view of a measuring head attachable to the reading scale of FIG. 8, the measuring head being utilized in semiautomatic measurements; and, FIGS. 10 and 11 depict two further examples of reading scales.

DETAILED DESCRIPTION OF PREFERRED EMBODIMENTS

Figure 1:
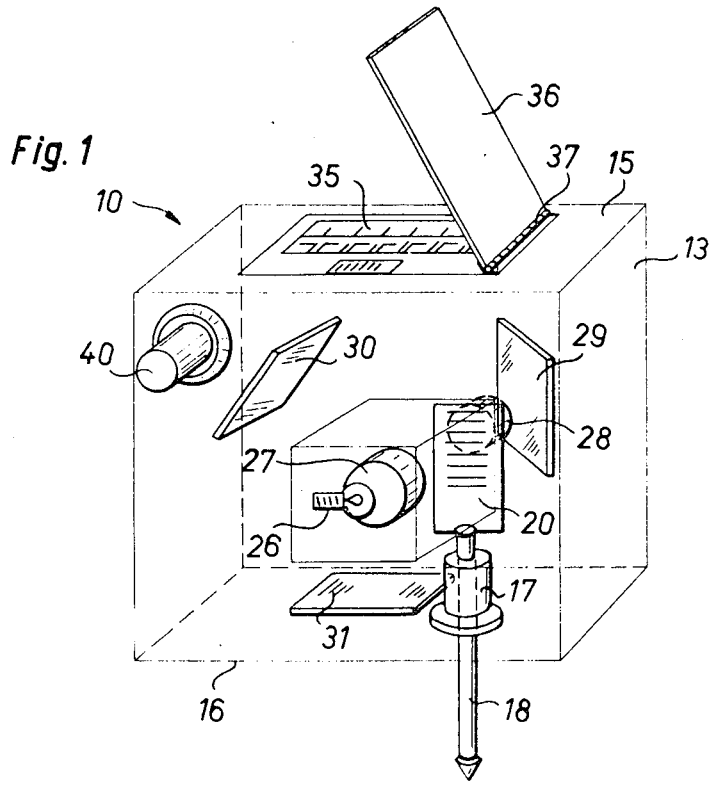
FIG. 1 is a perspective illustration of a first inventive embodiment.
Figure 2:
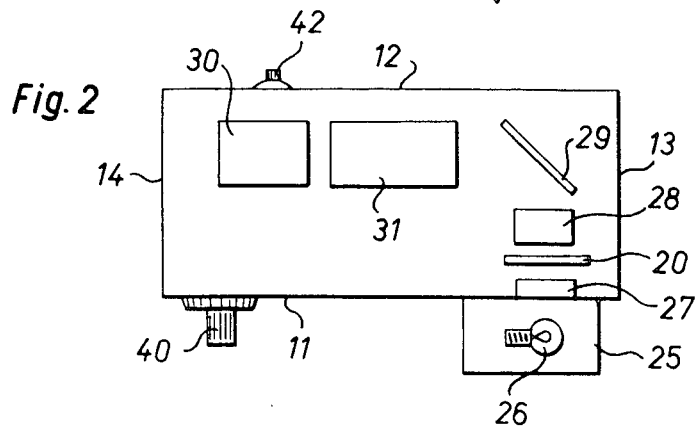
FIG. 2 is a top plane view of the apparatus of FIG. 1 in which the cover plate containing a reading scale has been deleted.

Referring now to the drawings, and particularly to FIGS. 1 and 2 thereof, a measuring apparatus 10 is depicted and is seen to include a housing two wide side walls 11 and 12 and two narrow sidewalls 13 and 14 as well as a cover and a base plate 15 and 16, respectively. A vertically disposed guide cylinder 17 is secured at the base plate 16 and a measuring sensor 18 is mounted in the bore of the cylinder 17 so as to be displaceable in a vertical direction. Additionally, a nonillustrated device is provided to secure the measuring sensor 18 against rotation about its longitudinal axis and to hold the measuring sensor in a predetermined rest position as long as the sensor is not acted upon by upwardly directed forces.

A transparent projection scale 20 is secured to the upper end of the measuring sensor 18 and directly follows the movements of the measuring sensor. Projection scale 20 includes a vertically extending calibration 25 mm. length, with a distance between each calibration or graduation line amounting to 1 mm. The graduation lines on the projection scale are continuously marked from 0 to 25. An illumination box 25 is disposed at the forward sidewall 11 of the housing as viewed in FIG. 1 in the proximity of projection scale 20. A light source 26 is disposed in the illumination box 25 and is connected to a nonillustrated external power source via nonillustrated conductor cables. A condenser lens 27 is disposed between the light source 26 and the projection scale 20.

There is also provided an image portrayal means for the projection scale which embodies a projection lens or objective 28 disposed on the side of the projection scale 20 opposite the light source 26 as is a first mirror 29 of a mirror system of such image portrayal means. Mirror 19 is vertically disposed in the same fashion as is projection scale 20 but is rotated about its vertical axis through an angle of 45° relative to the plane of the projection scale 20. A second mirror 30 is provided at the same height as the first mirror 29 but in proximity to the narrow sidewall 14 of the housing. Mirror 30 is disposed transverse to the plane of the projection scale 20 and further is inclined about its horizontal axis through an angle of approximately 45° Lastly, a third mirror 31 is disposed on the base plate 16 of the housing.

As best seen in FIG. 1, a large window is taken out from the cover plate 15 and a multiportion reading scale 35 to be described in greater detail hereinbelow is built into the window. A mirror 36 is hingedly mounted on cover plate 15 by means of a hinge joint 37. Reading mirror 36 can thus be rotated to a suitable position so as to facilitate observation of the reading scale or reading mirror 36 can be snapped upon the reading scale 35 so as to protectively cover the same.

At the forward sidewall 11 of the housing as viewed in FIG. 1, a knurled knob or screw 40 is provided which serves to manually adjust one of the reading scales 35 in a fashion as will be described hereinbelow. On the rear sidewall 12 of the housing also as viewed in FIG. 1, a further knurled knob 42 is provided which serves to rotate the second mirror 30 about its horizontal axis so as to displace the markings of the projection scale 20 as projected on reading scale 35 and, in particular, to displace the 0 point of such markings of the projection scale 20.

Figure 3:
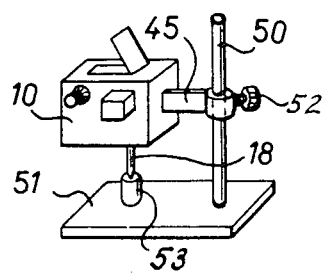
FIG. 3 is a perspective illustration of the inventive apparatus secured on a stand in a measuring position.

In order to perform measurements, the apparatus 10 is secured to a vertical column 50 by means of a support arm 45 as depicted in FIG. 3. For the purpose of coarse adjustment of the distance between a measuring plate 51 and the measuring sensor 18, the support arm 45 can be vertically displaced along the column 50 and can be locked in desired position by means of a screw 52. The height of the apparatus can be adjusted such that when the measuring sensor contacts the measuring plate, a 0 value is indicated on the reading scale 35. This height, however, can also be adjusted in a different fashion depending upon the height of the pieces to be measured or upon the tolerance ranges desired, respectively. When a piece 53 awaiting measurement is placed on the measuring plate 51 and moved under the measuring sensor 18, measuring sensor 18 must first be lifted and then again put on piece 53. During this operation, the projection scale 20 which is directly connected with the measuring sensor is also moved from its rest position. The light emitted from the light source 26 falls upon projection scale 20 through the condenser lens 27 so as to evenly and brightly illuminate the projection scale throughout a small area. The illuminated portion of the projection scale is then projected to the reading scale 35 via projection lens 28 and mirrors 29, 30 and 31.

Figure 5:
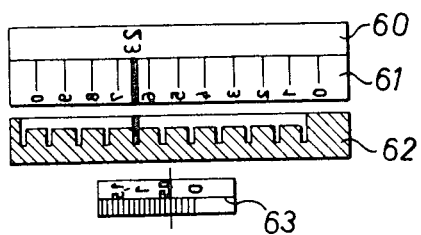
FIG. 5 depicts the reading scales of FIG. 4, two of such reading scales being displaced relative to the position shown in FIG. $.
Figure 4:
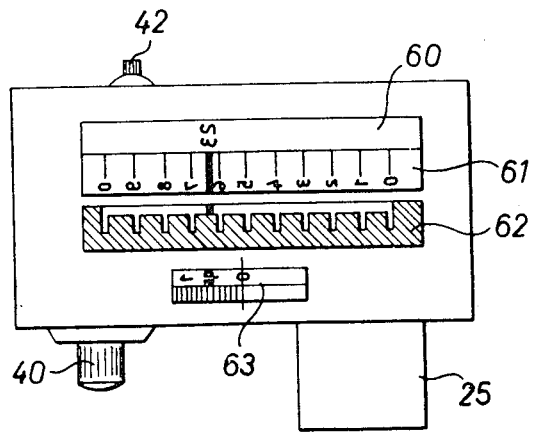
FIG. 4 depicts a top plan view of the housing in the various reading, scales of the instant invention.

Reading scale 35 preferably comprises four scales disposed adjacent to one another as best seen from FIGS. 4 and 5. A first frosted glass plate 60 is provided for projecting the digit marking disposed adjacent to each calibration or graduation line on the projection scale 20. A second frosted glass plate 61 is disposed next to frosted glass plate 60 and has calibration lines likewise marked by digits and evenly divided into ten large intervals, the second frosted glass plate 61 being utilized for projecting the calibration or graduation lines of projection scale 20. Next to the second frosted glass plate 61, a further scale 62 is provided having the same calibration as the frosted glass plate 61, scale 62 being displaceable through one interval in its longitudinal direction (i.e., the distance between two calibration lines on the frosted glass plate 61). Lastly, a scale 63 is provided next to the displaceable scale 62 and is connected with scale 62 so as to move with the latter. Scale 63 has one hundred lines of calibration. The connection effecting movement between scale 62 and scale 63 is constructed such that the displacement of scale 62 by one interval corresponds to a displacement of scale 63 by one hundred lines of calibration. The length of scale 63 is such that one hundred lines of calibration can be read by an observer without difficulty. Accordingly, scale 63 is preferably mounted on a drum. Displacement of scales 62 and 63 is effected by rotating knurled knob 40 via a drive means well known to those skilled in the art and accordingly not described herein.

The digit values on the individual scales and the digit value projected by the projection scale 20 to the frosted glass plate 60 are depicted in FIG. 4 in reflected face type since the reading scale in the illustrated embodiment of the invention is not directly observed but rather is observed through a reading mirror 36.

In the example of FIG. 4, a line of calibrations projected by the projection scale 20 to the second frosted glass plate 61 and to the displaceable scale 62 and the identifying digit 23 associated with this line of calibration is projected to the first frosted glass plate 60. The calibration of the second frosted glass plate 61 is selected and coordinated with projection lens or objective 28 such that one millimeter on the projection scale 20 corresponds to ten intervals on the second frosted glass plate 61. Accordingly, the projection depicted in FIG. 4 corresponds to a displacement of the measuring sensor 18 through a distance between 23.6 and 23.7 mm. Now, in order to determine the accurate digit value of the measuring sensor displacement, scale 62 is displaced by means of knurled knob 40 until such time as the transparent interval mark rests above the projected line of calibration (in FIGS. 4 and 5, the transparent interval mark is disposed to the right of the projected line of calibration), and the displacement of scale 62 can then be read in one hundreds of an interval on the movement coupled scale 63 of FIG. 5. The setting of the reading scales as shown in FIG. 5 corresponds to a displacement of the measuring sensor through a length of 23.604 mm.

Instead of the millimeter calibration as described, projection scale 20 can be calibrated in inches or in tenths of inches. The corresponding decimal values of the scale calibration can then be read off on scales 61, 62 and 63.

It is to be understood that the selected reading accuracy of 0.001 mm. of the instant invention is strictly arbitrary and that this accuracy can be increased without difficulty merely by interpolation of the reading on scale 63. Moreover, it is possible to increase the measurement accuracy as desired or to reduce the same, via a different division of the projection scale 20 and a different enlargement of the projection objective 28 or a different division and a different movement-coupling between scales 62 and 63.

The multiportion reading scale 35 can be simplified yet still maintain the same reading accuracy if a finer calibration is applied to the projection scale 20. The reading scale depicted in FIG. 10 is intended for use with a projection scale 20 on which the measurement lines or lines of calibration are disposed at a distance of 0.1 mm. from one another. Since the projection of the projection scale onto the reading scale already depicts tenths of millimeters, the second frosted glass plate is superfluous. Accordingly, the reading scale depicted in FIG. 10 contains only a first frosted glass plate 100, a displaceable scale 101, and a scale 102 which is movement-coupled with the displaceable scale. Furthermore, since the length of the scale utilized for precise or fine reading must be somewhat greater than the distance between two lines of calibration one the projected calibration, a displaceable scale 101 can be utilized in connection with the reading scale in FIG. 10, the displaceable scale 101 having a length amounting only to about one tenth of the length of the displaceable scale 62 of FIGS. 4 and 5. The indication of the reading scale depicted in FIG. 10 corresponds to a measured length of 15.684 mm.

It is also possible, of course, to utilize the projection scale 20 upon which parallel calibrations of a different measuring system are applied, these calibrations being projected to parallel frosted glass plates of the reading scale 35. One example of such a reading scale is depicted in FIG. 11. This reading scale is seen to comprise two parallel-disposed frosted glass plated 105 and 106, of which scale 105 has a fine calibration for reading one hundredths of millimeters and scale 106 has a fine calibration for reading one thousandths of inches and upon which a measured length can be simultaneously read in millimeters and in inches. The indication on the reading scale depicted in FIG. 11 corresponds to a length of 1.536 mm. and 0.6043 inches, respectively.

Figure 6:
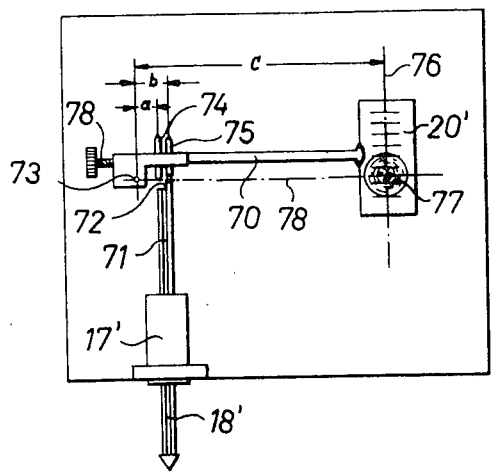

In yet another embodiment of the inventive apparatus, the projection scale 20′ is not directly connected with measuring sensor 18, but is connected via a lever arm 70 as is depicted in FIG. 6. In this inventive embodiment the same projection system is utilized as was utilized with the embodiment of FIG. 1, but, opposed to the embodiment of FIG. 1, the measuring sensor is displaced laterally relative to the projection scale and is disposed in the proximity of said wall 14 of the housing. A measuring guide is provided with a groove 71 extending in a longitudinal direction of the measuring sensor. Groove 71 cooperates with a nonillustrated spring-suspended ball disposed in the guide cylinder 17′ such that the measuring sensor is secured against unintentional rotation about its longitudinal axis but is capable of being rotated through 180° after first overcoming the force of the spring. The upper end of the measuring guide has a recess 72. The lever arm 70 is rotatably mounted about an axis 73 which is perpendicular to the direction of displacement of the measuring sensor. Additionally, two plates 74 and 75 are provided, each of the plates having sharp edges. As depicted in FIG. 6, plate 75 rests upon the measuring sensor 18′ The distance of plate 75 from the axis 73 amounts to exactly one fifth of the distance from the center line 76 of the projection scale to the rotational axis 73 such that each displacement of the measuring sensor transferred to the lever arm by plate 75 effects a five-time greater displacement of the projection scale.

The distance illustrated by "$a$" of the sharp edge of second plate 74 from the rotational axis 73 corresponds exactly to one tenth of the distance from the center line of the projection scale 20′ to the rotational axis 73 such that each displacement of the measuring sensor transferred to the lever arm by the second plate 74 effects a ten-time greater displacement of the projection scale. As has already been discussed above, the measuring sensor can be rotated through 180° about its longitudinal axis. During this rotation, the recess 73 depicted in FIG. 6 as drawn the plate 74, is rotated under plate 75 as a result of which the measuring sensor engages with plate 74. In the chosen ratio of lengths "$a:c$" or "$b:c$," respectively, the ratio of the displacement of the projection scale relative to the displacement of the measuring sensor can be quantitively changed in this manner through a simple rotation of the measuring sensor about its longitudinal axis.

So as to be able to accurately adjust as well as readjust the distance of the sharp edges of plates 74 and 75 from the rotational axis 73, these plates are secured on a finely threaded screw 78. In a simplified modification to this embodiment, the upper end of the measuring sensor 18′ would be constructed as a planar surface and the screw 78 would carry only one of the plates 74 or 75.

In embodiments of this type, the projection scale 20′ is not displaced parallel to the measuring sensor, that is to say, along a straight line, but rather is displaced on a circular arc about the rotational axis 73. So as to practically remove any possible measuring errors due to this arrangement, the rotational axis 73 and the point of support between plates 74 and 75, respectively, and the upper end of measuring sensor 18′ and the center of light beam 77 passing through projection scale 20′ must all lie on a straight line of connection 78. Furthermore, these embodiments are understandably intended for use only when measuring small lengths and particularly small changes in lengths within a range of one millimeter, for example. Yet, on the other hand, these embodiments can be utilized to measure the length with an accuracy of at least one micrometer if a projection scale is utilized which has a calibration of 0.1 mm. between each line of calibration.

Referring now to FIGS. 8 and 9, two further devices are depicted, which devices are intended particularly for use in semiautomatic measurements of large numbers of units such as in controls and manufacturing, for example. The projection scale 20″ depicted in FIG. 8 has a calibration 80 corresponding to the calibration described in connection with the embodiments of FIGS. 1 and 6. In the extension of this calibration, an additional scale is provided comprising a light-impermeable and a light-permeable portions 81 and 82, respectively. In utilizing this two-portion scale, the frosted glass plates 60 and 61 of reading scale 35 in FIG. 4 are fully illuminated in accordance with the position of the projection scale 20″ or such portions are dark, or such portions are illuminated only partially and have a sharp dividing line between the light and dark areas.

A measuring head 90 is depicted in FIG. 9 and is intended to cooperate with this scale. Measuring head 90 comprises two photoelectric cells 91 and 92 and can be disposed in a simple fashion on the housing of the apparatus over the reading scale 35 by means of a nonillustrated holding magnet. The photoelectric cells are themselves displaceable by means of two laterally disposed screws 93 and 94, respectively, in the longitudinal direction of the measuring head and thus in the longitudinal direction of the reading scale. By virtue of this displacement, the distance 95 between the cells can be set as desired. Each of the photoelectric cells are connected to a nonillustrated electrical circuit via nonillustrated cables or conductors.

During measuring operations in which measuring head 90 in the projection scale 20′ depicted in FIG. 8 is utilized, the distance of both photoelectric cells 91 and 92 is adjusted such that this distance corresponds to the permissible tolerance of measurements transferred to the reading scale. With length s which re within such predetermined tolerance limits, only one of the two photoelectric cells would then be illuminated by the light-permeable portion 82 of the projection scale whereas the other photoelectric cell would remain dark by means of the light-impermeable portion 81 of the scale. As soon as the measured length is either too great or too small, then either both of the photoelectric cells would be illuminated or both would remain dark. The nonillustrated electrical circuit connected with the photoelectric cells would then supply a reading or indication determining whether the measured length is within the set tolerance range or whether the length is smaller or greater.

Although throughout the instant specification, there has been described only the measuring of test pieces inserted between a measuring plate and a measuring sensor, it should be appreciated that the inventive apparatus could be utilized in another manner such as, for example, in the manner of utilization of known mechanical dial gauges for measuring the rotational true of cylindrical surfaces.

As should also be appreciated, if the entire measuring range of the inventive apparatus is correspondingly reduced to a maximum of 0.1 mm. for example, the ratio of both shanks of the lever arm depicted in FIGS. 6 and 7 can correspondingly be enlarged, for example, to 1:100 which then would permit a corresponding enlargement of the accuracy of reading.

It should now be apparent that the objects initially set forth at the outset of the specification, have been successfully achieved. Accordingly,

What is claimed is:

1. An apparatus for measuring lengths, said apparatus comprising a measuring sensor displaceable along its longitudinal direction, a projection scale having measuring marks, means for movement-connecting said projection scale with said measuring sensor, a multiportion reading scale for displaying the measuring marks of said projection scale thereat, an illumination device and image portrayal means cooperating with said projection scale in order to project said projection scale at said multiportion reading scale and to display said measuring marks thereat, said means for movement-connecting said projection scale with said measuring sensor incorporating mechanism for increasing the displacement of said projection scale relative to the displacement of said measuring sensor, said mechanism embodies a lever arm for enlarging the displacement of said projection scale relative to the displacement of said measuring sensor, and means provided at said lever arm defining two points of contact for said measuring sensor in order to obtain two different enlargements of the displacement of said projection scale relative to the displacement of said measuring sensor.

2. The apparatus as defined in claim 1, further including an eccentric support location provided for said measuring sensor at its end cooperating with said lever arm said eccentric support location cooperating with said lever arm in such manner that upon rotating said measuring sensor through 180° about its longitudinal axis said eccentric support location cooperates with one of said two points of contact of said lever arm.

3. the apparatus as defined in claim 1, further including means defining a pivot axis for said lever arm, and means for adjusting the spacing of said two points of contact from said pivot axis of said lever arm.

4. The apparatus as defined in claim 3, further including an eccentric support location provided for said measuring sensor at its end cooperating with said lever arm, said eccentric support location cooperating with said lever arm in such manner that upon rotating said measuring sensor through 180° about its longitudinal axis said eccentric support location cooperates with one of said two points of contact of said lever arm, said adjusting means for regulating the spacing of said two points of attack from said pivot axis of said lever arm comprising screw means provided with fine threading and wherein each point of attack is constructed as a disc provided with a sharp knife edge.

5. The apparatus as defined in claim 1, wherein said reading scale includes a first stationary calibration and a noncalibrated frosted glass plate, said first stationary calibration displaying said measuring marks of said projection scale, and a second calibration adjacent said stationary calibration, said second calibration having ten lines of calibration and being mechanically displaceable through an area bounded by two lines of calibration, said reading scale further including a third calibration which is movement-connected with said second calibration, said third calibration being disposed next to and on the side of said second calibration opposite said first calibration, said third calibration being provided for quantitative indication of the displacement of said second calibration.

* * * * *